(12) United States Patent
Crowder, Jr.

(10) Patent No.: US 6,748,341 B2
(45) Date of Patent: Jun. 8, 2004

(54) METHOD AND DEVICE FOR MACHINERY DIAGNOSTICS AND PROGNOSTICS

(76) Inventor: George E. Crowder, Jr., 4903 Fieldwood Ct., Fairfax, VA (US) 22030

( * ) Notice: Subject to any disclaimer, the term of this patent is extended or adjusted under 35 U.S.C. 154(b) by 216 days.

(21) Appl. No.: 10/121,647

(22) Filed: Apr. 12, 2002

(65) Prior Publication Data

US 2003/0195718 A1 Oct. 16, 2003

(51) Int. Cl.⁷ .................................................. G01F 1/56
(52) U.S. Cl. ........................................ 702/181; 702/183
(58) Field of Search .............................. 702/34–36, 56, 702/81, 82, 181–185, 189

(56) References Cited

U.S. PATENT DOCUMENTS

| | | | | |
|---|---|---|---|---|
| 5,414,632 A | * | 5/1995 | Mochizuki et al. | 700/180 |
| 5,602,761 A | * | 2/1997 | Spoerre et al. | 702/179 |
| 5,884,245 A | * | 3/1999 | Chandler | 702/189 |
| 5,905,648 A | * | 5/1999 | Badami | 700/55 |
| 6,041,287 A | * | 3/2000 | Dister et al. | 702/182 |
| 6,298,308 B1 | * | 10/2001 | Reid et al. | 702/56 |
| 6,549,869 B1 | * | 4/2003 | Piety et al. | 702/122 |
| 6,584,836 B1 | * | 7/2003 | Shteinhauz et al. | 702/146 |
| 6,591,296 B1 | * | 7/2003 | Ghanime | 702/188 |
| 2003/0158705 A1 | * | 8/2003 | Ishii et al. | 702/183 |
| 2003/0164762 A1 | * | 9/2003 | Ridley | 340/521 |

* cited by examiner

Primary Examiner—Marc S. Hoff
Assistant Examiner—Craig Steven Miller
(74) Attorney, Agent, or Firm—Michael G. Petit

(57) ABSTRACT

Machinery diagnostics and prognostics is an emerging engineering field that seeks to accurately determine the operational health of a machine without waiting for the machine to fail, performing maintenance that may not yet be required or, in the worst case, performing unnecessary maintenance that inadvertently causes other problems and hastens machine health deterioration. Accurate prediction of machine health (operability) enables operators to base machine maintenance on the machine's actual condition, in contrast to the common practice of time-based maintenance (e.g., perform maintenance every 100 hours). The "just-in-time" methodology of the machine health monitoring system (MHMS) of the present invention translates into significant cost savings by providing early warning of impending failures and thus reducing unanticipated catastrophic machine failures through preventative maintenance techniques (but no more or no less than is required) while simultaneously keeping false alarm rates low. The MHMS couples proprietary analysis, modeling and pattern recognition techniques to provide accurate machine health predictions. The MHMS's combination of technologies provides accurate, easy-to-understand, early indication of potential problems, enabling efficient and timely repair. In addition, MHMS technology can continuously "learn" from its own machine health monitoring experience, so that system accuracy and false alarm rate improve over time.

2 Claims, 1 Drawing Sheet

METHOD AND DEVICE FOR MACHINERY DIAGNOSTICS AND PROGNOSTICS

BACKGROUND OF THE INVENTION

1. Field of the Invention

A method and device for machinery diagnostics and prognostics.

2. Prior Art

The machine-health-monitoring problem is widespread, very costly to the nation, and starting to be recognized. In 1996, the National Science Foundation (NSF) convened a workshop on the subject, inviting 37 experts from academia, government, and industry to participate. With respect to the current state of the art, it was suggested by at least some of the attendees that the current design of manufacturing and monitoring processes does not necessarily exploit the state-of-the-art in digital signal processing. In fact, it can be argued that little machine health monitoring research has actually been done within the signal processing community that specifically addresses the needs and nature of these types of problems.

Participants in the aforesaid NSF meeting also reported that for many critical applications, machinery condition assessment has the potential to save billions of dollars while dramatically increasing safety and reliability. Examples include power generation turbines and critical equipment in nuclear reactors or on large oilrigs, where unscheduled failure can result in lost revenue approaching a million dollars per day. Failure during operations of aircraft machines or power train components in helicopters often results in loss of life along with the equipment. For example, it was reported that between 1985 and 1992, the U.S. Navy lost 67 airframes and 84 lives due to material-related failure in helicopters. Failure during operations of critical machinery on a Navy capital ship during wartime could endanger the security of the nation. Methods for machinery condition assessment which provide warning in time to cease operations or schedule maintenance offer immense value in such applications, and methods and devices for monitoring the condition of such machines is already routinely used or eagerly sought.

The maintenance of turbine machines alone costs the Navy hundreds of millions of dollars per year. The cost and security risk of unscheduled failure is high, so prophylactic maintenance is routinely practiced. At great expense, in both dollars and downtime, critical components are routinely replaced long before their mean time to failure in order to reduce the risk of failure during operations. Unfortunately, it is suspected that the majority of failures are due to problems introduced by faulty maintenance; that is, the routine maintenance itself is the dominant cause of failure. For both cost reduction and for improved reliability, the Navy would prefer to adopt an "if it ain't broke, don't fix it" philosophy. But this can only be done without endangering Navy operations with reliable machinery condition assessment and early detection of precursors to equipment failure. Much the same conditions and logic prevail in the Air Force, as well as among other organizations operating high-value equipment.

Current technologies for machine health monitoring are usually based on the concept of individual variables exceeding or approaching upper and lower limits. Existing machine health monitoring systems typically monitor machine variables and notify an operator or maintenance personnel when a particular variable exceeds or is approaching a limit. The method and device of the present invention also employs this limit method, but only as a minor ancillary function. The principal and unique function of the device and method of the present invention is not just to monitor individual machine variables (e.g., pressure, temperature) relationship to fixed limits, but instead to monitor all of their relationships to each other and to recognize developing abnormal relationships far in advance of any individual variable approaching a fixed limit.

SUMMARY OF THE INVENTION

It is a first object of the invention to provide a device and method for obtaining an accurate assessment of the normality of measurable machine variables and thus predict future machine operability.

It is a further object of the invention to provide a method, which may be used in a computer environment, to diagnose a problem affecting machine operability.

It is another object of the invention to provide a computer readable medium bearing instructions that cause a computer to provide an accurate assessment of machine variable relationships and thus to predict future machine operability.

It is yet another object of the invention to provide means for accomplishing the above objectives in "real-time," so that the predictions can be made while the machine is operating based on the measured values of the current operating variables being produced by the machine.

The above objectives are met by automatically developing a set of accurate multivariate transfer function models (TFMs) of machine variables and their relationships over time that are deemed most important by the user, machine expert, or machine operator. A TFM is simply a statistical model or function that converts "inputs" to "outputs", as illustrated in FIG. 1. Comparison of TFM predictions of "normal" machine variable values and relationships to actual observed machine variable and relationships is then accomplished by abnormality detection algorithms in accordance with the present invention. The combination of TFMs and abnormality detection algorithms are so powerful, the device and method of the present invention detects small abnormalities (on the order of 0.01% of normal operating values) with high probability while keeping false alarm rates low. The benefits are both reduced wasted maintenance resources due to false alarms and time-based actions and reduced catastrophic failures due to missed subtle indicators.

The present invention discloses, in one aspect, a computer readable medium whose contents include a set of instructions that cause a computer system to perform an accurate machine health prediction upon receipt of raw system variables data from the machine, the computer readable medium comprising: (a) a data filtering component comprising a filtering algorithm operable for eliminating "spikes" in the raw system variables data while leaving legitimate "ups and downs" in the data intact, thereby improving the predictive performance of transfer function models (TFMs); (b) a TFM estimator component comprising a multivariate non-linear transfer function estimation algorithm that uses historical or real-time calibration data comprised of values of machine operating variables from one or more normally operating machines to define "normal" and to construct statistical multivariate non-linear TFMs of "normal" machine variables; (c) a TFM modelbase comprising (i) a plurality of TFMs; and (ii) the operational condition variable values employed to develop the TFMs; (d) a Predictor component that finds the best TFMs in the TFM modelbase for the monitored machine variables and the current set of real-time machine operational conditions and uses those to predict one-step-ahead values for the monitored machine variables; (e) a Comparator component that compares what an operating machine is producing in the way of monitored variable values to what the appropriate TFMs predict for the same variables, producing the algebraic differences, called residuals; and (f) a prognosticator component that receives the residuals for each monitored machine variable from the Comparator component and conducts statistical tests on the residuals to categorize each machine variable as normal or abnormal. The Prognosticator uses the results of the tests on each machine variable to calculate an overall probability of machine abnormality (PMA), the value of which is predictive of machine failure.

In another aspect, the present invention provides a method for predicting machine failure comprising the steps of: (a) presenting a machine having an operability that is dependent on the values of a set of machine variables; (b) presenting a computer means comprising the computer readable medium described above; (c) measuring the set of machine variables, the set of measured machine variables comprising input to said computer means; and (d) observing the value of the PMA, the value of the PMA being predictive of machine failure. The features of the invention believed to be novel are set forth with particularity in the appended claims. However the invention itself, both as to organization and method of operation, together with further objects and advantages thereof may be best understood by reference to the following description taken in conjunction with the accompanying drawings in which:

DESCRIPTION OF THE PREFERRED EMBODIMENTS

Artisans skilled in art will appreciate the value of illustrating the present invention by means of an example. Consider early detection of "abnormalities" (prognostics) and classification of those abnormalities (diagnostics) based on historical Digital Electronic Engine Controller data from many normally operating F-16 fighter aircraft F100-PW-229 gas turbine (jet) engines (GTEs) to learn what is "normal" and to automatically construct statistical multivariate non-linear transfer function models (TFMs) of normal GTE variable values and relationships over the entire range of normal GTE operation.

Pre-Processing Filters

Figure 1:
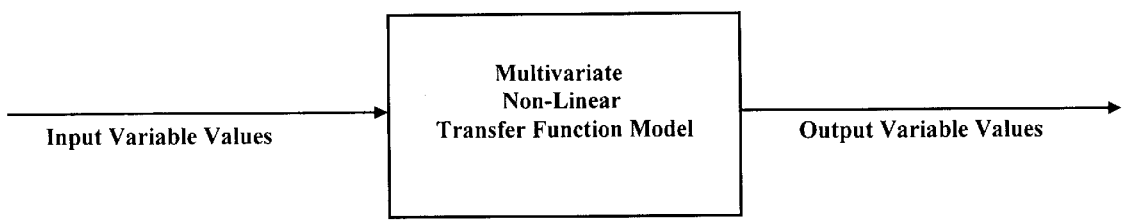
FIG. 1 is a diagrammatic representation of a Transfer Function Model.
Figure 2:
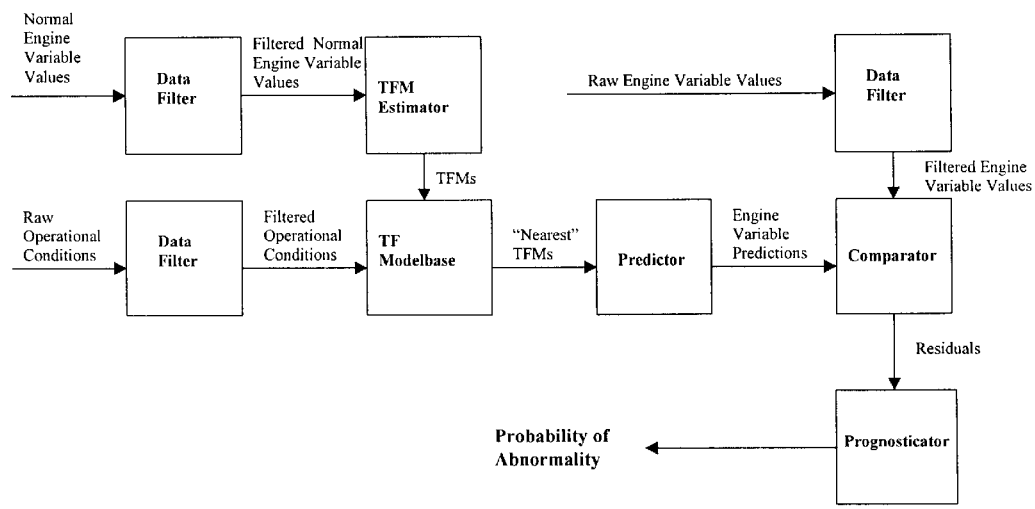
FIG. 2 is a diagrammatic representation illustrating the operation of the machinemonitoring device of the present invention.

The present invention can be thought of as a machine health monitoring system (MHMS). FIG. 2 illustrates the process of automatically developing TFMs for machine health monitoring (MHM). The TFM estimation process automatically takes raw data for machine variables of interest (generally those believed to be the most important to the particular machine's health by experts, operators or maintenance), filters the data to eliminate anomalous data "spikes" that are typically present in machine data produced by analog or digital sensors, estimates appropriate TFMs for each variable of interest relating that variable to all other variables of interest, and places the TFMs so developed into the Transfer Function Modelbase (TFMB). If historical, recorded data is used to develop the TFMs, this process is not real-time. If the MHMS is provided data feeds from an operating machine or machines, then the TFM estimation process occurs in real-time as the machine is operating.

Most machine operating data contains instances of "spikes" for almost all monitored machine variables, where a "spike" is defined to be a large deviation of a machine variable (e.g., temperature) from some pre-spike value that lasts only one sampling interval (e.g., 0.25 sec) before returning to its pre-spike value. Inclusion of these spikes when estimating TFMs makes them less accurate than would otherwise have been the case. For GTE data, the present inventor has found that in a data set of 2000 sample points (at 0.25 second sampling interval) for a given GTE variable, there are often 8–10 such spikes. The data-filtering algorithm of the MHMS eliminates spikes while leaving legitimate "ups and downs" in the data intact, improving the predictive performance of TFMs by approximately 5% on average.

TFM Estimator

The approach employed in the MHMS uses either historical data or real-time collected data from one or more normally operating machines (GTE's for example) to learn what's "normal" and to construct statistical multivariate non-linear TFMs of "normal" output variable behavior. Note that the term "normal", as used herein, has nothing to do with the normal probability distribution. Accordingly, the term "Gaussian" is used for the probability distribution to avoid confusion. In general, TFMs that make highly accurate predictions of machine (GTE) variables have been developed for the MHMS. TFMs are automatically developed from either GTE historical or real-time operating data for all GTE variables of interest using generalized least squares estimation. In general, a TFM is developed for every GTE variable of interest and for a variable number of sample points $n_i$. The automated TFM estimation algorithms select the sample size for each TFM based on the statistical variability of the output variable being modeled. Low variability regions of performance leads to larger sample size for TFM development, while higher variability leads to smaller sample sizes for TFM development. In general, one would expect TFMs to be better (in terms of predictive performance) when developed based on larger sample sizes. On the other hand, as TFM development is based on a wider and wider range of operational conditions represented by larger and larger sample sizes, it becomes increasingly difficult for a single TFM to model the wider and wider range of behavior. Thus there is an optimal sample size for TFM development that is a balance between these two considerations. In practice, the balance changes, depending on the statistical variability of the variable being modeled. The current MHMS TFM Estimator is based on a fast generalized least squares (GLS) estimation algorithm (Christensen, R. (1996). *Plane Answers to Complex Questions: The Theory of Linear Models*. Springer-Verlag) that provides optimal estimates of the parameters of the TFMs and is an improvement over the Marquardt non-linear least squares estimation algorithm (Marquardt, D. W. (1963). "An Algorithm for Least Squares Estimation of Nonlinear Parameters." *Journal of the Society for Industrial and Applied Mathematics*, 11:2, 431–441) recommended by Box, Jenkins, and Reinsell. The present inventor's research and the more recent literature indicated that GLS can improve upon Marquardt algorithm performance. The GLS algorithm employed in the MHMS estimates TFMs 20 times faster and produce TFM fits to the data that are twice as good as can be obtained with the usual Marquardt algorithm.

However, the present inventor has found that the automatic application GLS TFM Estimator code (i.e., with no human intervention) tended to produce TFMs that are overfit; that is, they give extremely tight fits to the data used to develop them, but yield comparatively poor predictive accuracy when used with new data. Investigation found that this occurred because the GLS estimation code tended to select all possible input variables to develop a TFM for a given output variable. In order to improve the robustness and predictive accuracy of TFMs developed with the automatic GLS estimation algorithm, a method was devised for automatically restricting the input variables for TFM estimation to those with the greatest impact on the output variable being estimated.

The general non-linear transfer function model is of the form (Kantz, H. and T. Schreiber (1997). *Nonlinear Time Series Analysis*. Cambridge University Press):

$$Y_t = f(Y_{t-1}, Y_{t-2}, \ldots Y_{t-b_d}, X_{1,t}, X_{1,t-1}, X_{1,t-2}, \ldots X_{1,t-b_1}, X_{2,t}, X_{2,t-1}, X_{2,t-2}, \ldots X_{2,t-b_2},$$
$$X_{m,t}, X_{m,t-1}, X_{m,t-2}, \ldots X_{m,t-b_m}, a_t, a_{t-1}, a_{t-2}, \ldots a_{t-b_s}) \quad (1)$$

where $Y_t$ is the GTE variable being modeled for time period t, $Y_{t-j}$ are the past values of Y in time period (t-j), bd's the maximum number of past values of Y, $X_{i,t-j}$, i=1,2, ..., m, are the values of independent variables at time period t used to predict Yt, $X_{i,t-j}$, i=1,2, ..., m, are the past values of $X_i$ in time period (t-j), $b_i$, i=1,2, ..., m, are the maximum number of past values of $X_i$, $a_t$ is a "random shock" at time period t, $a_{t-j}$ are the past values of a at time period (t-j), and $b_s$ is the maximum number of past values of a in the TFM. The problem of automating the decision about the best structure of each TFM before estimating its parameters had to be solved. In terms of Eq. (1), this problem is reduced to deciding which of the possible $X_{i,t}$ variables, and how many past values of them, to include, and how many past values of Y and a to include in the TFM structure. Kendall's tau statistic (Conover, W. J. (1998). *Practical Non-Parametric Statistics*. $3^{rd}$ ed. John Wiley) was employed to automate these decisions. This statistic is easy to compute and interpret and has a high asymptotic relative efficiency of 91% when compared to a more computationally difficult test using Spearman's r statistic (Stuart, A. (1954). "Asymptotic Relative Efficiency of Tests and the Derivatives of Their Power Functions." *Skandanavisk Aktaurietidskrift*, 163–169). Kendall's tau is a statistic such that $-1 \leq \tau \leq 1$. When comparing a potential input variable time series with an output variable time series, we compare each point and count the number of discordances $N_d$ and concordances $N_c$, where a concordance is where both series move in the same (positive or negative) direction compared to their previous value, and a discordance is where they move in opposite directions. If one or both variables do not move (remain constant) then there is neither a concordance nor discordance. Tau is computed for each variable pair by τ

$$\tau = \frac{N_c - N_d}{n(n-1)/2}$$

where n is the total number of pairs being evaluated. A tau value of 1 would mean perfect concordance between the variables, a −1 perfect discordance, whereas a tau of zero would mean no relationship between them whatsoever. The stronger relationships (discordant or concordant) are included in the MHMS TFMs while the weaker relationships. After much experimentation, all input variables where $|\tau| \leq 0.15$ were excluded from the TFMs. Using this rule has resulted in much more robust TFMs in the sense of their predictive accuracy over a wide range of data.

TFM Modelbase

The TFMs that are automatically developed from either GTE historical or real-time operating data representing normal behavior t are placed in a computerized repository called a transfer function modelbase (TFMB). The TFMB also contains a multidimensional search space that contains the operational conditions (e.g., for GTE's throttle setting, Mach, ambient temperature, ambient pressure) associated with every sampled data point in the historical or real-time "normal" or "training" data set used to develop the TFMs in the TFMB. The TFMB also associates every sampled data point with its resultant TFM.

Predictor

After a set of variables are "picked off" or sampled from an operating GTE in real-time, the best existing TFM in the TFMB for the current set of operational conditions is selected to be used for prediction. This is accomplished by first finding the single multi-dimensional point of the perhaps tens of thousands of multi-dimensional points that most closely matches the real-time "picked-off" point (set of operational conditions), and then by identifying the single TFM associated with the matched point. That TFM will be the best for predicting future values of the GTE variable of interest. This is a classic "nearest-neighbor problem," a very common but difficult problem that often occurs in image compression and pattern matching applications.

To quickly find the TFM that was developed on GTE operating conditions nearest to those we want to make predictions for, a nearest neighbor algorithm, developed by Sunil Arya and David Mount (Arya, S., D. M. Mount, et al.(1998). "An Optimal Algorithm for Approximate Nearest Neighbor Searching." *Journal of the ACM*, 45, 891–923), of the University of Maryland's Institute of Advanced Computer Studies, was implemented. This algorithm preprocesses the search space/points into what is referred to in the nearest neighbor literature as a k-d tree structure. This structure allows very fast search to find the nearest TFMB point and associated TFM to each real-time set of GTE operational conditions. The Predictor function of the MHMS, in accordance with the present invention, then uses the selected TFMs (one for each GTE variable of interest) to predict the one-step-ahead future values of the GTE variables of interest.

Comparator

Once accurate TFMs of "normal" GTE performance have been developed, placed in the TFMB, selected in real-time, and used to predict the next-step-ahead values of the GTE variables of interest, the MHMS's Comparator function simply compares the predicted values for the ith GTE variable $\hat{Y}_{it}$ at time t with the actual variable value at time t, $Y_{it}$. The Comparator function then calculates the residuals for each variable i at time period t: $\hat{a}_{it} = \hat{Y}_{it} - Y_{it}$. By the GLS estimation theory, these residuals should be Guassian random variables with a mean of zero.

Prognosticator

Once the residuals are computed for each GTE variable of interest, they are passed to the Prognosticator component of the MHMS where a statistical test is applied to decide whether the residuals are attributable to an "abnormal" GTE variable or to normal statistical variability. Our invention employs a statistical test that provides good visibility and control over false alarm rate α and failed alarm rate β.

The test employed for "GTE variable normality" is based on the non-parametric binomial test. In statistical terms, the test can be stated as follows:

H₀: The GTE variable in question is "normal" ("null hypothesis").

H_a: The GTE Variable in question is "abnormal" ("alternate hypothesis").

Restating these hypotheses in terms of TFM residuals ($\hat{a}_{it}$'s) for a specific variable, $Y_i$:

H₀: Number of $\hat{a}_u$'s that fall +/-kσ beyond the mean residual value is normal.

H_a: Number of $\hat{a}_u$'s that fall +/-kσ beyond the mean residual value is abnormal.

A binomial test is based on dividing a statistical sample into two mutually exclusive classes (hence the term binomial). In this case, the classes are defined by <+/-kσ from the mean and >+/-kσ from the mean. To operationalize the test, the hypotheses is restated once again:

H₀: p=p₀ where p₀ is the expected proportion of $\hat{a}_u$'s that are +/-kσ beyond the mean residual value.

H_a: p=P_a>p₀

Thus, our hypotheses about GTE variable normality/abnormality have translated into hypotheses about the proportion of residuals that fall +/-kσ beyond the residual mean value, which in turn leads to the question of how to choose k. It should be noted that the relationship between k and po depends on the probability distribution of the residuals. With GLS TFM estimation, the residuals are Gaussian distributed.

From a theoretical standpoint, k could be any value. Larger k's, for example, k's $\geq 2$, are equivalent to testing for outliers, or an excessive number of values a great distance from the mean. However, it seems likely that GTE or other complex machine abnormality might not initially be reflected in the generation of such outliers. Therefore, a small value of k would have the opportunity of detecting small abnormalities that might go undetected with a large value of k. Note that small values of k mean large values for p₀ and vice versa. A good result has been achieved with a k of 0.125, which corresponds to a p₀ of ~0.9.

The test statistic for the "GTE variable normality" hypothesis test is based on $$\hat{p} = \frac{w}{n}$$

where w is the number is the number of residual values that fall more than +/-kσ beyond the mean residual value and n is the total number of residuals. For large samples, the test statistic for the binomial test is $$z = \frac{\hat{p} - p_0}{\sqrt{\frac{p_0(1-p_0)}{n}}}$$

and "large" sample is further defined as np₀(1-p₀)≧9. The rejection region for the test is z>z_α where a is the significance of the test and the probability of rejecting H₀ when it is in fact true probability of false alarm), and z_α is the area under the standard Gaussian distribution curve associated with a, which can be obtained from any statistics reference. It should be noted that a does not depend on k, so the choice of k does not affect the false alarm rate of the test.

By selecting a, the probability of false alarm for the test is determined. Obviously, if this were the only consideration we could make a arbitrarily small. However, the probability of failed alarm (generally designated β) is inversely related to a for a given sample size n and given sensitivity parameter p_a. Consequently, for a given n and p_a, as a approaches 0, β approaches 1 and vice versa. Thus the only way to achieve both small a and small β simultaneously is to increase n and/or increase p_a. Using a procedure outlined by Wackerly, Mendenhall, and Scheaffer, the following formula relating n, α, β and p_a is derived:

$$n = \frac{z_\alpha^2 p_0(1-p_0) + 2z_\alpha z_\beta \sqrt{p_0 p_a (1-p_0)(1-p_a)} + z_\beta^2 p_a(1-p_a)}{(p_a - p_0)^2} \quad (1)$$

where $z_\beta$ is the area under the standard Gaussian distribution curve associated with β, (p_a-p₀) is the minimum difference between p and p₀ we wish to be able to detect (this is why p_a is the sensitivity parameter), and all other elements of the formula are as previously defined. For example, if α=β=0.005, p₀=0.9 and p_a=0.96, the above formula yields n=453. This formula shows that if multiple TFMs and an entire GTE flight's worth of data are used for the test (i.e., 15,000<n<30,000), great sensitivity to abnormalities can be achieved while keeping probability of false alarm and probability of failed alarm simultaneously low.

The Prognosticator function of the invention computes the results of the statistical test for each GTE variable of interest repeatedly over time as the number of sampled variable values (n) grows over time. The Prognosticator combines the results of each of these tests to calculate an overall probability of abnormality for the GTE as a whole. This probability calculation is updated continuously as the results of the repeated statistical tests come in. The formula yielding this probability was derived through the application of Bayesian statistics using Bayes's theorem (Pearl, J. 1988. *Probabilistic Reasoning in Intelligent Systems: Networks of Plausible Inference*. Morgan Kaufman).

$$P(\tilde{N} | \tilde{Y}_1, \tilde{Y}_2, \ldots, \tilde{Y}_m, Y_{m+1}, Y_{m+2}, \ldots, Y_n) = \quad (2)$$

$$\frac{P(\tilde{N})P(\tilde{Y}_1, \tilde{Y}_2, \ldots, \tilde{Y}_m, Y_{m+1}, Y_{m+2}, \ldots, Y_n | \tilde{N})}{P(\tilde{Y}_1, \tilde{Y}_2, \ldots, \tilde{Y}_m, Y_{m+1}, Y_{m+2}, \ldots, Y_n)}$$

where $\tilde{N}$ is the event that the monitored GTE is abnormal, $\tilde{Y}_i$ is the event that ith GTE variable is classified as abnormal by the statistical test, $Y_i$ is the event that the ith GTE variable is classifed as normal by the statistical test, $P(\tilde{N}, \tilde{Y}_1, \tilde{Y}_2, \ldots, \tilde{Y}_m, \tilde{Y}_{m+1}, \tilde{Y}_{m+2}, \ldots, Y_n)$ is the probability that a monitored GTE is normal given that the Prognosticator classified m of the n monitored GTE variables as abnormal and classified n-m as normal, $P(\tilde{N})$ is the a priori probability that the GTE is abnormal, $P(\tilde{Y}_1, \tilde{Y}_2, \ldots, \tilde{Y}_m Y_{m+1}, Y_{m+2}, \ldots, Y_n | \tilde{N})$ is the probability that m of the n monitored GTE variables are classified as normal and n-m are classified as abnormal by the statistical test when the GTE is in fact abnormal, and $P(\tilde{Y}_1, \tilde{Y}_2, \ldots, \tilde{Y}_m, Y_{m+1}, Y_{m+2}, \ldots, Y_n)$ is the unconditional probability that the Prognosticator will classify m of the n monitored GTE variables as normal and m-n as abnormal. It should be noted that relation (2) above is simply Bayes' Rule for this problem. The challenge was deriving the components of the Bayes' Rule equation. Thus, $$P(\tilde{N}) = \gamma \quad (3)$$

where γ is the a priori probability that a given GTE is abnormal. In addition, it can be shown that:

$$P(\tilde{Y}_1, \tilde{Y}_2, \ldots, \tilde{Y}_m, Y_{m+1}, Y_{m+2}, \ldots, Y_n \mid \tilde{N}) = \quad (4)$$

$$\prod_{i=1}^{m} [\alpha_i \delta_i + (1-\beta_i)(1-\delta_i)] \times \prod_{i=m+1}^{n} [(1-\alpha_i)\delta_i + \beta_i(1-\delta_i)]$$

where $\alpha_i$ is the probability of our statistical test categorizing the ith GTE variable as abnormal when it is in fact normal, $\beta_i$ is the probability of our statistical test categorizing the ith GTE variable as normal when in fact it is abnormal, and $\delta_i$ is the a priori probability that the ith GTE variable will be normal when the GTE is abnormal. Finally, it can be shown that the denominator of relation (2) is given by:

$$P(\tilde{Y}_1, \tilde{Y}_2, \ldots, \tilde{Y}_m, Y_{m+1}, Y_{m+2}, \ldots, Y_n) = \quad (5)$$

$$(1-\gamma) \prod_{i=1}^{m} \alpha_i \prod_{i=m+1}^{n} (1-\alpha_i) +$$

$$\gamma \prod_{i=1}^{m} [\alpha_i \delta_i + (1-\beta_i)(1-\delta_i)] \times \prod_{i=m+1}^{n} [(1-\alpha_i)\delta_i + \beta_i(1-\delta_i)]$$

Therefore, substituting relations (3)–(5) into relation (2) yields:

$$P(\tilde{N} \mid \tilde{Y}_1, \tilde{Y}_2, \ldots, \tilde{Y}_m, Y_{m+1}, Y_{m+2}, \ldots, Y_n) = \quad (6)$$

$$\frac{\gamma \prod_{i=1}^{m} [\alpha_i \delta_i + (1-\beta_i)(1-\delta_i)] \times \prod_{i=m+1}^{n} [(1-\alpha_i)\delta_i + \beta_i(1-\delta_i)]}{(1-\gamma) \prod_{i=1}^{m} \alpha_i \prod_{i=m+1}^{n} (1-\alpha_i) + \gamma \prod_{i=1}^{m} [\alpha_i \delta_i + (1-\beta_i)(1-\delta_i)] \times \prod_{i=m+1}^{n} [(1-\alpha_i)\delta_i + \beta_i(1-\delta_i)]}$$

Thus, relation (6) provides dynamic probability of GTE abnormality based on the continuing results of the statistical test results on all of the GTE variables of interest, taking into account $\alpha$, $\beta$, $\gamma$ and $\delta$ for each variable.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What I claim is:

1. A computer readable medium having instructions encoded thereon that cause a computer system to perform an accurate machine health prediction upon receipt of raw monitored machine operating variables data from said machine, the instructions on the computer readable medium comprising:

(a) a data filter comprising a filtering algorithm operable for eliminating "spikes" in said raw monitored machine operating variables data while retaining legitimate "ups and downs" in the raw monitored machine operating variables data, thereby improving the predictive performance of transfer function models (TFMs);

(b) a TFM estimator comprising a multivariate non-linear transfer function estimation algorithm that uses historical or real-time calibration data comprised of values of machine operating variables from one or more normally operating machines to define normal monitored machine operating variables and to construct statistical multivariate non-linear TFMs of normal monitored machine operating variables;

(c) a TFM modelbase comprising (i) a plurality of TFMs; and (ii) a set of sampled normal monitored machine operating variable values and operational condition values employed to develop said plurality of TFMs;

(d) a predictor operable for identifying the best TFMs in the TFM modelbase for the monitored machine operating variables data and the current set of real-time machine operational conditions, and uses said monitored machine operating variables to predict one-step-ahead values for said monitored machine operating variables;

(e) a comparator that enables the computer to compare current monitored machine operating variable values to the value of the monitored machine operating variables predicted by the appropriate TFMs for the same variables, and producing the algebraic differences therebetween, said differences defining residuals;

(f) a prognosticator component that receives the residuals for each monitored machine operating variable from said comparator and conducts statistical tests on said residuals to categorize each monitored machine operating variable as normal or abnormal, and employ the results of said statistical tests on each monitored machine operating variable to calculate an output, the value of the output being a measure of the overall probability of machine abnormality.

2. A method for predicting machine failure comprising the steps of: (a) presenting a machine wherein operability of the machine is dependent on the values of a set of machine variables; (b) presenting a computer means comprising the computer readable medium of claim 1; (c) measuring the set of machine variables to provide a set of measured machine variables, the set of measured machine variables comprising input to said computer means; and (d) observing the value of the PMA output of the computer means, the value of the PMA being predictive of machine failure.

* * * * *